(12) United States Patent
White et al.

(10) Patent No.: US 7,196,722 B2
(45) Date of Patent: *Mar. 27, 2007

(54) MULTIPLE CAMERA VIDEO SYSTEM WHICH DISPLAYS SELECTED IMAGES

(75) Inventors: Patrick White, Aloha, OR (US); Brian Hunt, Portland, OR (US); G. David Ripley, Portland, OR (US)

(73) Assignee: iMove, Inc., Portland, OR (US)

(*) Notice: Subject to any disclaimer, the term of this patent is extended or adjusted under 35 U.S.C. 154(b) by 690 days.

This patent is subject to a terminal disclaimer.

(21) Appl. No.: 09/860,962

(22) Filed: May 18, 2001

(65) Prior Publication Data

US 2003/0197785 A1  Oct. 23, 2003

Related U.S. Application Data

(60) Provisional application No. 60/254,453, filed on Dec. 7, 2000, provisional application No. 60/205,942, filed on May 18, 2000.

(51) Int. Cl.
*H04N 5/232* (2006.01)
*H04N 5/225* (2006.01)

(52) U.S. Cl. .............. 348/211.99; 348/218.1; 348/14.01

(58) Field of Classification Search ........... 348/207.99, 348/207.1, 207.11, 211.99, 211.1, 211.3–211.13, 348/14.01, 14.03, 720, 723, 143, 149, 153, 348/218.1; 725/61, 86, 87; 709/203, 209, 709/217; 345/762, 776, 716, 719
See application file for complete search history.

(56) References Cited

U.S. PATENT DOCUMENTS

| | | | |
|---|---|---|---|
| 4,573,072 A | 2/1986 | Freeman | |
| 4,602,279 A | 7/1986 | Freeman | |
| 4,847,698 A | 7/1989 | Freeman | |
| 4,847,699 A | 7/1989 | Freeman | |
| 4,847,700 A | 7/1989 | Freeman | |
| 4,918,516 A | 4/1990 | Freeman | |
| 5,258,837 A * | 11/1993 | Gormley | 348/441 |
| 5,382,972 A * | 1/1995 | Kannes | 348/14.01 |
| 5,537,141 A | 7/1996 | Harper | |
| 5,585,858 A | 12/1996 | Harper | |

(Continued)

FOREIGN PATENT DOCUMENTS

EP    0 314 572 B1    5/1994

(Continued)

*Primary Examiner*—Aung Moe
(74) *Attorney, Agent, or Firm*—Fenwick & West LLP

(57) ABSTRACT

Multiple streams of data are streamed to a user's terminal with images from different cameras. Low resolution thumbnail images tell the user what image streams are available. A focus stream provides high resolution images from a selected camera. A user can switch the focus stream to another stream by clicking on the associated thumbnail. The users can also be provided with a thumbnail of panoramic image. Other data streams sent to the user can contain (a) audio data, (b) interactivity markup data which describes regions of the image which provide interactivity opportunities such as hotspots, (c) presentation markup data which defines how data is presented on the user's screen, (d) a telemetry data stream which can be used for various statistical data. One data stream contains a low quality base image for each data stream which can be enhanced to form a high resolution focus image.

20 Claims, 17 Drawing Sheets

U.S. PATENT DOCUMENTS

| | | | |
|---|---|---|---|
| 5,625,410 A * | 4/1997 | Washino et al. | 348/154 |
| 5,632,007 A | 5/1997 | Freeman | |
| 5,648,813 A | 7/1997 | Tanigawa | |
| 5,682,196 A | 10/1997 | Freeman | |
| 5,706,457 A | 1/1998 | Dwyer et al. | |
| 5,724,091 A | 3/1998 | Freeman | |
| 5,729,471 A * | 3/1998 | Jain et al. | 725/131 |
| 5,745,161 A * | 4/1998 | Ito | 348/211.13 |
| 5,774,664 A | 6/1998 | Hidary | |
| 5,778,181 A | 7/1998 | Hidary | |
| 5,861,881 A | 1/1999 | Freeman | |
| 6,006,265 A | 12/1999 | Rangan et al. | |
| 6,028,603 A * | 2/2000 | Wang et al. | 345/776 |
| 6,144,375 A * | 11/2000 | Jain et al. | 715/500.1 |
| 6,154,771 A * | 11/2000 | Rangan et al. | 709/217 |
| 6,185,369 B1 | 2/2001 | Ko | |
| 6,307,550 B1 * | 10/2001 | Chen et al. | 345/418 |
| 6,452,615 B1 | 9/2002 | Chiu et al. | |
| 6,591,068 B1 | 7/2003 | Dietz | |
| 6,618,074 B1 * | 9/2003 | Seeley et al. | 348/143 |
| 6,636,259 B1 | 10/2003 | Anderson et al. | |
| 6,646,655 B1 * | 11/2003 | Brandt et al. | 715/723 |
| 6,675,386 B1 * | 1/2004 | Hendricks et al. | 725/105 |
| 6,741,977 B1 * | 5/2004 | Nagaya et al. | 348/143 |
| 2001/0013123 A1 | 8/2001 | Freeman | |
| 2002/0049979 A1 * | 4/2002 | White et al. | 725/87 |
| 2002/0089587 A1 * | 7/2002 | White et al. | 348/105 |
| 2002/0133405 A1 | 9/2002 | Newman | |
| 2002/0154210 A1 * | 10/2002 | Ludwig et al. | 348/14.08 |
| 2002/0188943 A1 | 12/2002 | Freeman | 725/38 |
| 2003/0174154 A1 * | 9/2003 | Yukie et al. | 345/700 |

FOREIGN PATENT DOCUMENTS

| | | |
|---|---|---|
| EP | 0 982 943 A2 | 3/2000 |
| EP | 0 982 943 A3 | 5/2000 |
| EP | 1 021 036 A2 | 7/2000 |
| EP | 1 021 037 A2 | 7/2000 |
| EP | 1 021 038 A2 | 7/2000 |
| WO | WO 96/05699 | 2/1996 |
| WO | WO 96/37075 | 11/1996 |
| WO | WO 97/29458 | 8/1997 |
| WO | WO 97/33434 | 9/1997 |
| WO | WO 98/41020 | 9/1998 |
| WO | WO 00/16544 | 3/2000 |

* cited by examiner (the server)

(when focus stream changed thumbnail images used initially)

SYSTEM OVERVIEW

| Top Camera Thumbnail | Panoramic Image Thumbnail 901 | Bottom Camera Thumbnail |
|---|---|---|
| Left side Camera Thumbnail | Focus Image | Right side Camera Thumbnail |
| Front Camera Thumbnail | | Back Camera Thumbnail |
| | | |

FIG. 9

MULTIPLE CAMERA VIDEO SYSTEM WHICH DISPLAYS SELECTED IMAGES

RELATED APPLICATIONS

This application is a continuation in part of application 60/205,942 filed May 18, 2000 and a continuation of in part of application 60/254,453 filed Dec. 7, 2000.

APPENDIX CONSISTING OF A COMPACT DISK WITH COMPUTER PROGRAMS

This application includes a compact disk appendix containing the following files ASCII text files:

| | | |
|---|---|---|
| a) iMoveRendererPlayer_dll | size 5737 KB | created May 10, 2001 |
| b) PanFileFormat_dll | size 1618 KB | created May 10, 2001 |
| c) Copyright | size 1 KB | created May 10, 2001 |

The material on the compact disk submitted with this application is hereby incorporated herein by reference.

FIELD OF THE INVENTION

The present invention relates to transmitting video information and more particularly to systems for streaming and displaying video images.

BACKGROUND OF THE INVENTION

In many situations, a scene or object is captured by multiple cameras, each of which capture a scene or object from a different angle or perspective. For example, at an athletic event multiple cameras, each at a different location, capture the action on the playing field. While each of the cameras is viewing the same event, the image available from the different cameras is different due to the fact that each camera views the event from a different angle and location. Such images can not in general be seamed into a single panoramic image.

The technology for streaming video over the Internet is well developed. Streaming video over the internet, that is, transmitting a series of images requires a substantial amount of bandwidth. Transmitting multiple streams of images (e.g. images from multiple separate cameras) or transmitting a stream of panoramic images requires an exceptionally large amount of bandwidth.

A common practice in situations where an event such as a sporting event is captured with multiple cameras, is to utilize an editor or technician in a control room to select the best view at each instant. This single view is transmitted and presented to users that are observing the event on a single screen. There are also a number of known techniques for presenting multiple views on a single screen. In one known technique, multiple images are combined into a single combined image which is transmitted and presented to users as a single combined image. With another technique the streams from the different cameras remain distinct and multiple streams are transmitted to a user who then selects the desired stream for viewing. Each of the techniques which stream multiple images require a relatively large amount of bandwidth. The present invention is directed to making multiple streams available to a user without using an undue amount of bandwidth.

SUMMARY OF THE INVENTION

The present invention provides a system for capturing multiple images from multiple cameras and selectively presenting desired views to a user. Multiple streams of data are streamed to a user's terminal. One data stream (called a thumbnail stream) is used to tell the user what image streams are available. In this stream, each image is transmitted as a low resolution thumbnail. One thumbnail is transmitted for each camera and the thumbnails are presented as small images on the users screen. The thumbnail stream uses a relatively small amount of bandwidth. Another data stream (called the focus stream) contains a series of high resolution images from a selected camera. The images transmitted in this streams are displayed in a relatively large area on the viewer's screen. A user can switch the focus stream to contain images from any particular camera by clicking on the associated thumbnail. In an alternate embodiment in addition to the thumbnails from individual cameras a user is also provided with a thumbnail of panoramic image (e. g. a full 360 degree panorama or a portion thereof) which combines into a single image, the images for multiple cameras. By clicking at a position on the panoramic thumbnail, the focus stream is switched to an image from viewpoint or view window located at the point in the panorama where the user clicked. In other alternate embodiments a variety of other data streams are also sent to the user. The other data streams sent to the user can contain (a) audio data, (b) interactivity markup data which describes regions of the image which provide interactivity opportunities such as hotspots, (c) presentation markup data which defines how data is presented on the user's screen, (d) a telemetry data stream which can be used for various statistical data. In still another embodiment one data stream contains a low quality base image for each data stream. The base images serve as the thumbnail images. A second data stream contains data that is added to a particular base stream to increase the quality of this particular stream and to create the focus stream.

BRIEF DESCRIPTION OF THE DRAWINGS

FIG. 9 illustrates the display on a user's display with an alternate embodiment of the invention.

DETAILED DESCRIPTION

Figure 1:
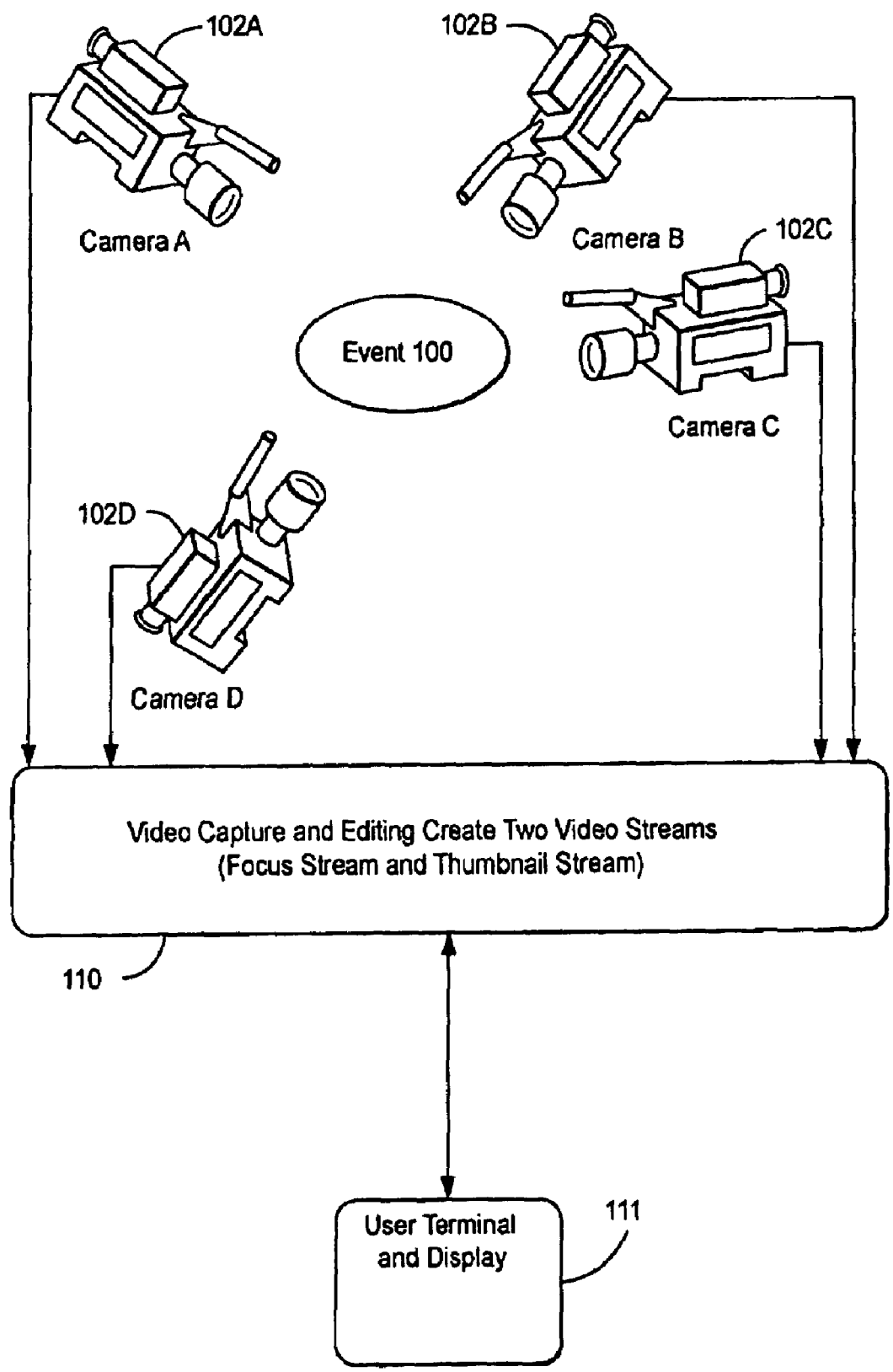
FIG. 1 is an overall high level diagram of a first embodiment of the invention.

An overall diagram of a first relatively simplified embodiment of the invention is shown in FIG. 1. In the first embodiment of the invention, an event 100 is viewed and recorded by the four cameras 102A to 102D. The event 100 may for example be a baseball game. The images from cameras 102A to 102D is captured and edited by system 110. System 110 creates two streams of video data. One stream is the images captured by "one" selected camera. The second stream consists of "thumbnails" (i.e. small low resolution images) of the images captured by each of the four cameras 102A to 102D.

Figure 2:
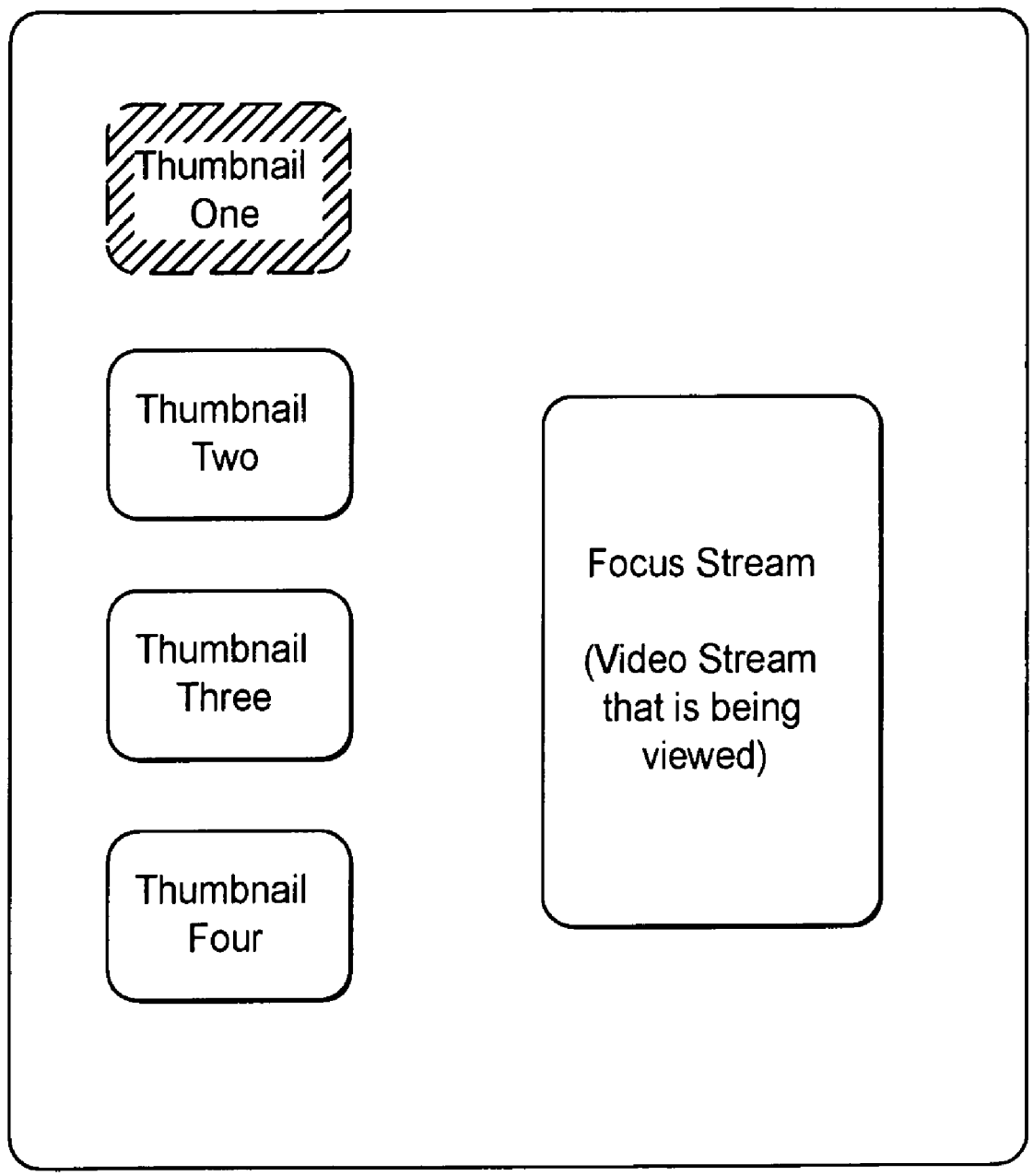
FIG. 2 illustrates the view on a user's display screen.

The two video streams are sent to a user terminal and display 111. The images visible to the user are illustrated in FIG. 2. A major portion of the display is taken by the images from one particular camera. This is termed the focus stream. On the side of the display are four thumbnail images, one of which is associated with each of the camera 102A to 102D. It is noted that the focus stream requires a substantial amount of bandwidth. The four thumbnail images have a lower resolution and all four thumbnail images can be transmitted as a single data stream. Examples of the bandwidth used by various data streams are given below.

Figure 3:
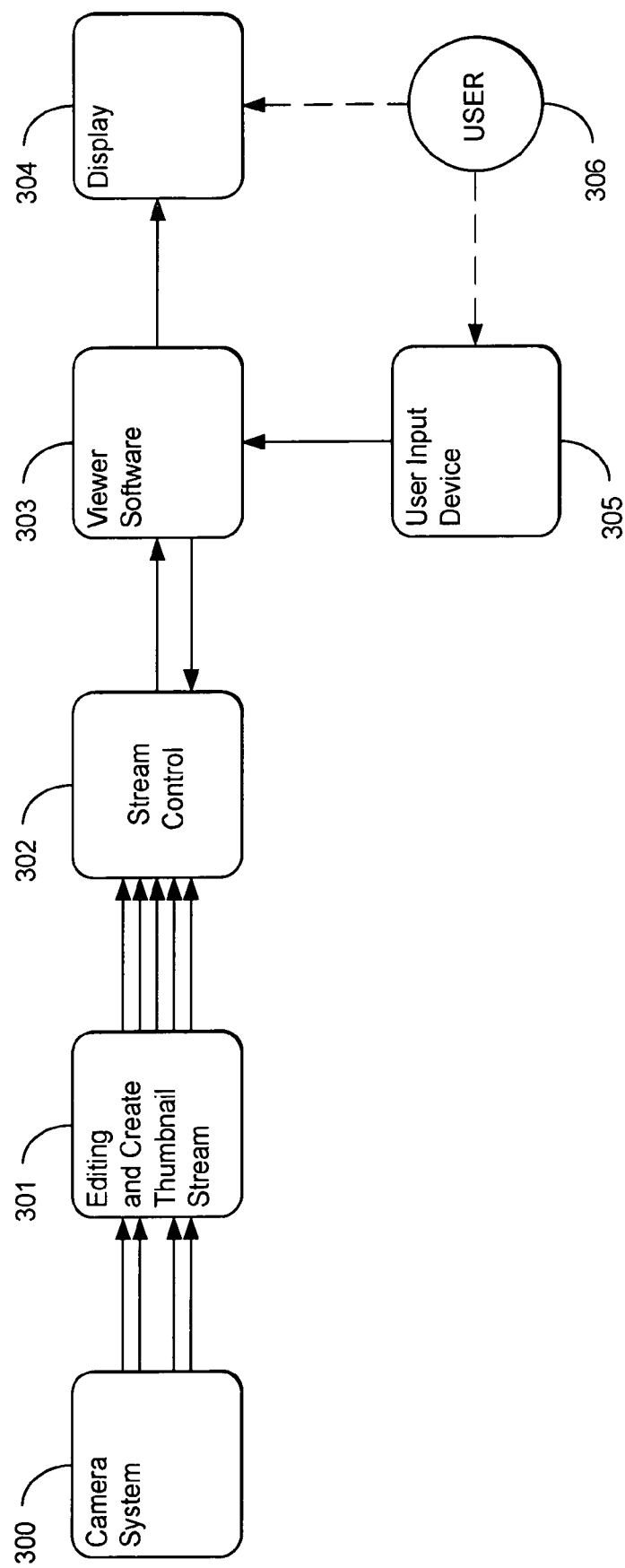
FIG. 3 is a block diagram of a first embodiment of the invention.
Figure 3A:
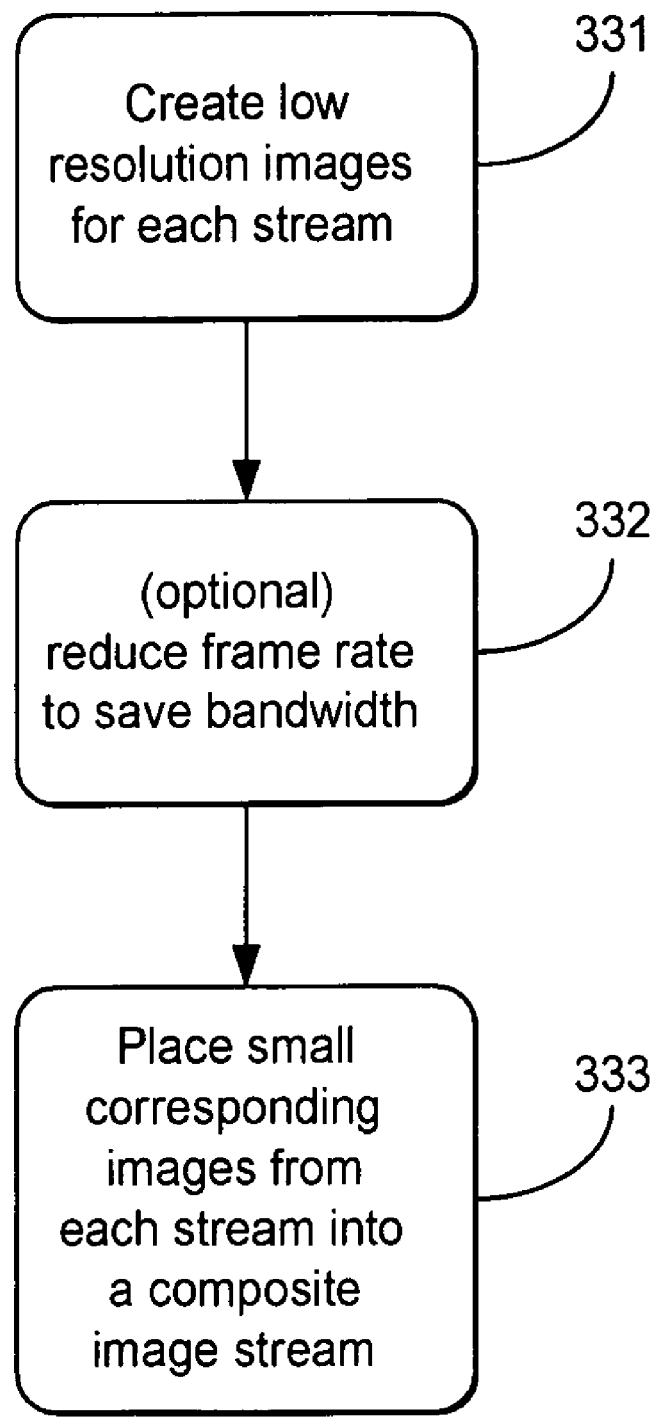
FIG. 3A illustrates how the thumbnail data stream is constructed.

FIG. 3 illustrates a the components in a system used to practice the invention and it shows how the user interacts with the system. Camera system 300 (which includes camera 102A to 102B) provides images to unit 301 which edits the image streams and which creates the thumbnail image stream. The amount of editing depends on the application and it will be discussed in detail later. FIG. 3A illustrates how the thumbnail data stream is created. The data stream from each camera and the thumbnail data stream are provided to stream control 302.

The user 306 can see a display 304. An example of what appears on display 304 is shown in FIG. 2. The user has an input device (for example a mouse) and when the user "clicks on" anyone of the thumbnails, viewer software 303 sends a message to control system 302. Thereafter images from the camera associated with the thumbnail which was clicked are transmitted as the focus stream.

FIG. 3A is a block diagram of the program that creates the thumbnail data stream. First as indicated by block 331, a low resolution version of each data stream is created. Low resolution images can, for example, be created by selecting and using only every fourth pixel in each image. Creating the low resolution image in effect shrinks the size of the images. As indicated by block 332, if desired the frame rate can be reduced by eliminating frames in order to further reduce the bandwidth required. The exact amount that the resolution is reduced depends on the particular application and on the amount of bandwidth available. In general a reduction in total pixel count of at least five to one is possible and sufficient. Finally, as indicated by block 333 The corresponding thumbnail images from each data stream are placed next to each other to form composite images. The stream of these composite images is the thumbnail data stream. It should be noted that while in the data stream the thumbnails are next each other, when they are displayed on the client machine, they can be displayed in any desired location on the display screen.

Figure 4A:
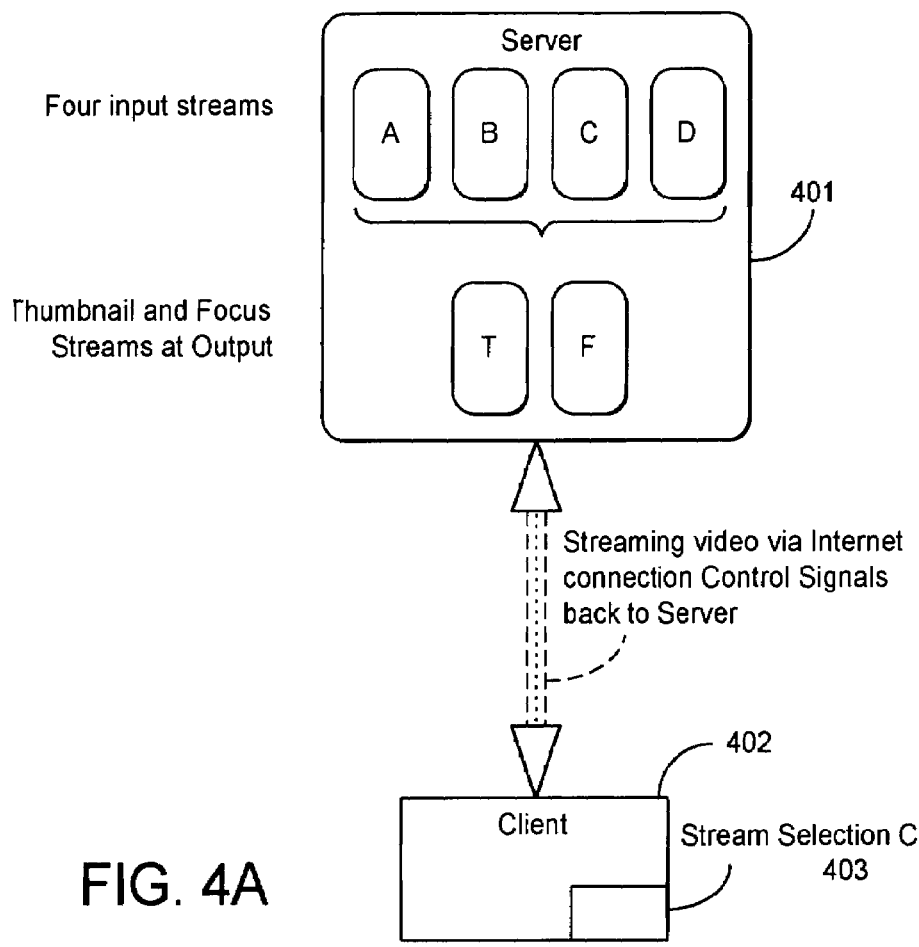
FIG. 4A illustrates how the user interacts with the system.

The details of a first embodiment of the invention are given in FIGS. 4A to 4F. In this first embodiment of the invention, system 110 includes a server 401 which streams video to a web client 402 as indicated in FIG. 4A. The server 401 takes the four input streams A to D from the four camera 102A to 102D and makes two streams T and F. Stream T is a thumbnail stream, that is, a single stream of images wherein each image in the stream has a thumbnail image from each of the cameras. Stream F is the focus stream of images which transmits the high resolution images which appear on the user's display. As shown in FIG. 2, the users display shows the four thumbnail images and a single focus stream.

The web client 402 includes a stream selection control 403. This may for example be a conventional mouse. When the user, clicks on one of the thumbnails, a signal is sent to the server 401 and the focus stream F is changed to the stream of images that coincides with the thumbnail that was clicked. In this embodiment server 401 corresponds to stream control 302 shown in FIG. 3 and client 402 includes components 303, 304 and 305 shown in FIG. 3. The details of the programs in server 401 and client 402 are shown in FIGS. 4B to 4E and are described later.

Figure 4B:
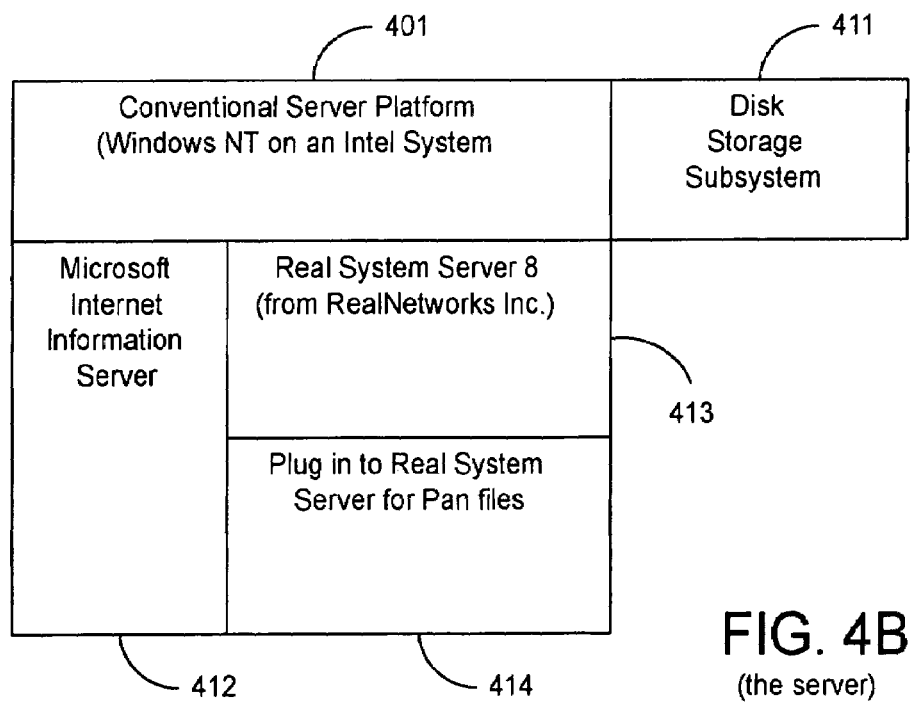
FIGS. 4B to 4F show in more detail elements shown in FIG. 4A.
Figure 4C:
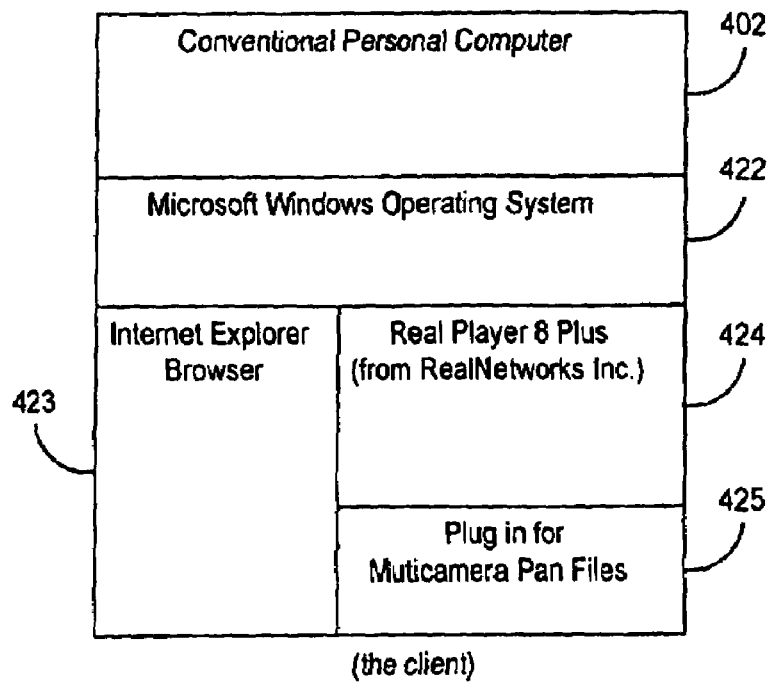
Figure 4D:
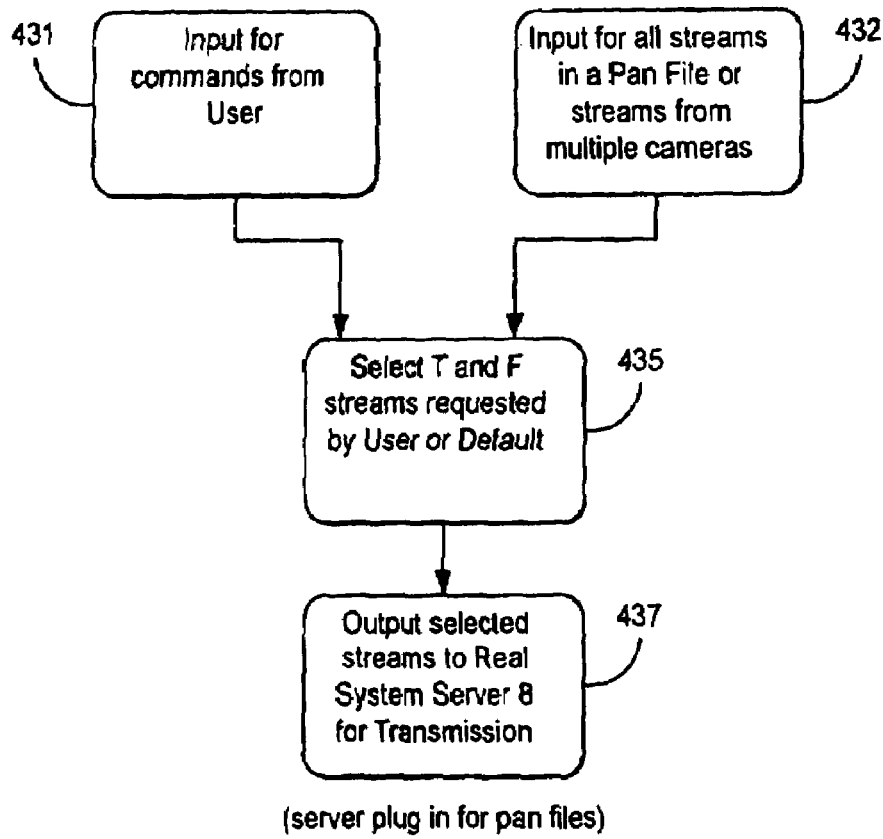
Figure 4E:
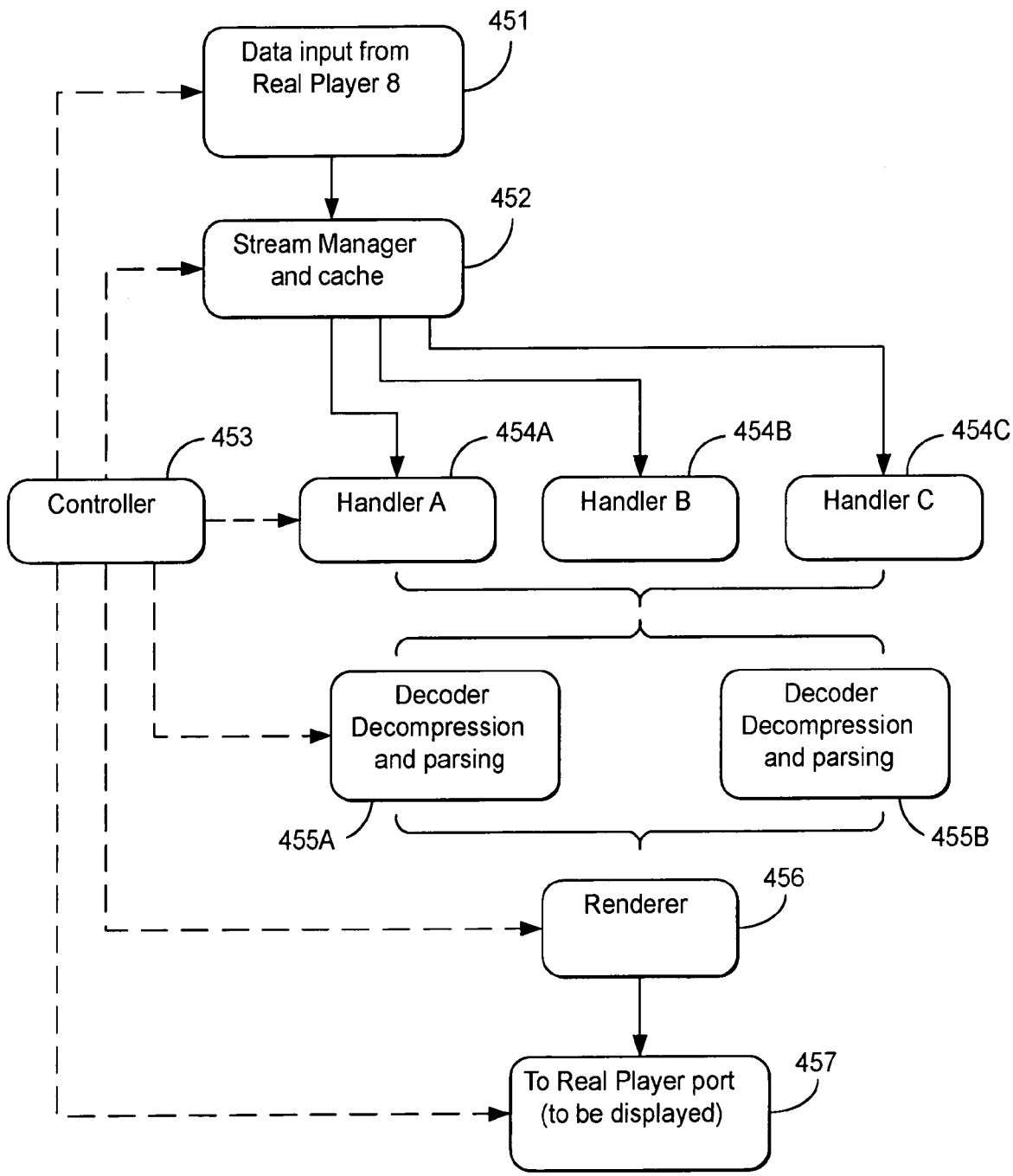
Figure 4F:
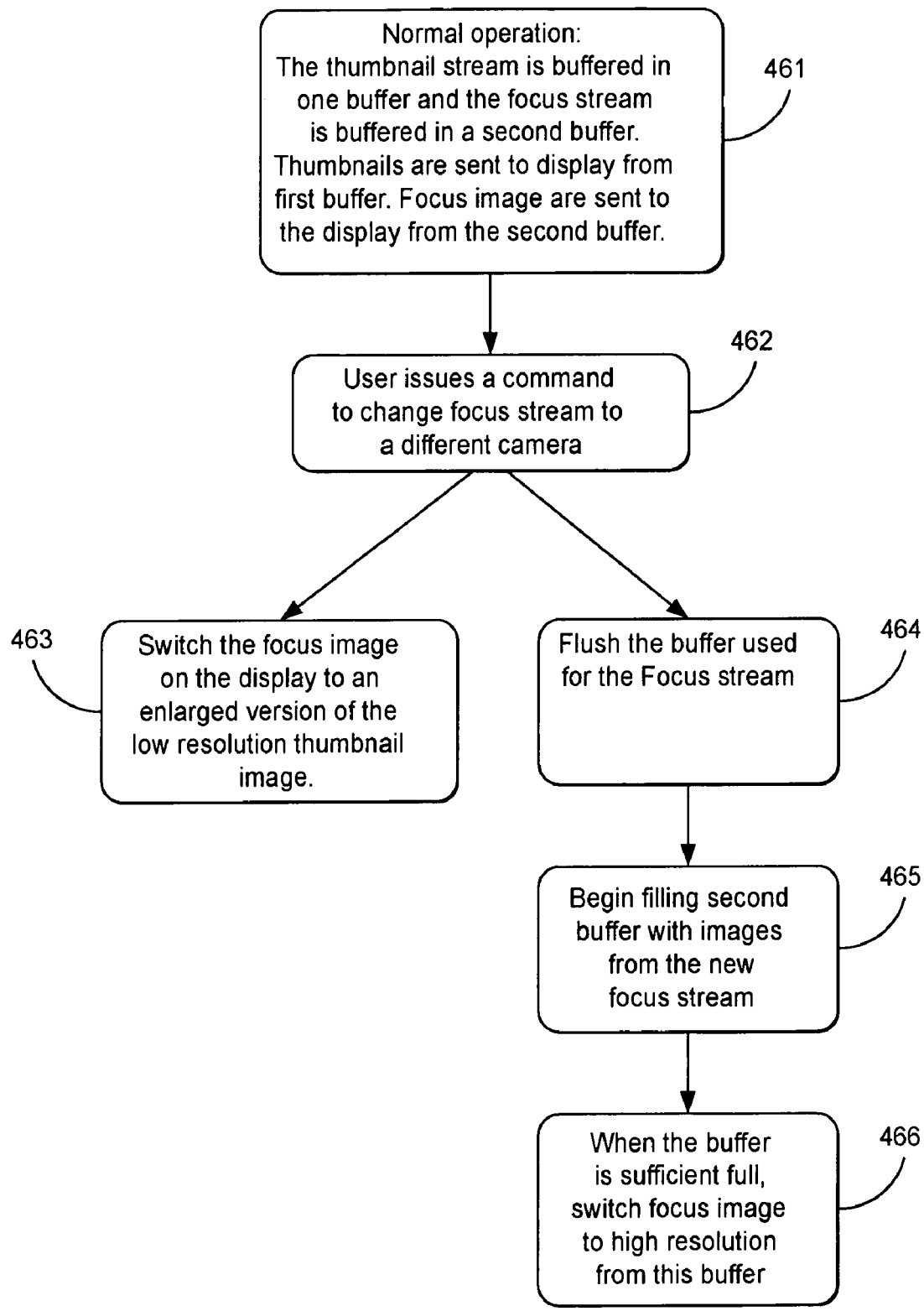

An optional procedure that can be employed to give a user the illusion that the change from one stream to another stream occurs instantaneously is illustrated in FIG. 4F. FIG. 4F shows a sequence of steps that can take place when the user decides to change the focus stream to a different camera. It is noted that under normal operation, a system receiving streaming video buffers the data at the input of the client system to insure continuity in the event of a small delay in receiving input. This is a very common practice and it is indicated by block 461. When a command is given to change the focus stream, if the procedure shown in FIG. 4F is not used, there will be a delay in that when the client begins receiving the new stream, it will not be displayed until the buffer is sufficiently filled. This delay can be eliminated using the technique illustrated in FIG. 4F. With this technique when a viewer issues a command to change the focus stream the large image on the viewer's screen is immediately changed to an enlarged image from the thumbnail of the camera stream newly requested by the user. This is indicated by block 463. That is, the low resolution thumbnail from the desired camera is enlarged and used as the focus image. This insures that the focus image changes as soon as the user indicates that a change is desired. The buffer from the focus data stream is flushed and it begins filling with the images from the new focus stream as indicated by blocks 464 and 465. As indicated by block 466, when the buffer is sufficiently full of images from the new stream, the focus image is changed to a high resolution image from this buffer.

As indicated by block 301, the data streams from the cameras are edited before they are sent to users. It is during this editing step that the thumbnail images are created as indicated in FIG. 3A. The data streams are also compressed during this editing step. Various known types of compression can be used.

Figure 5:
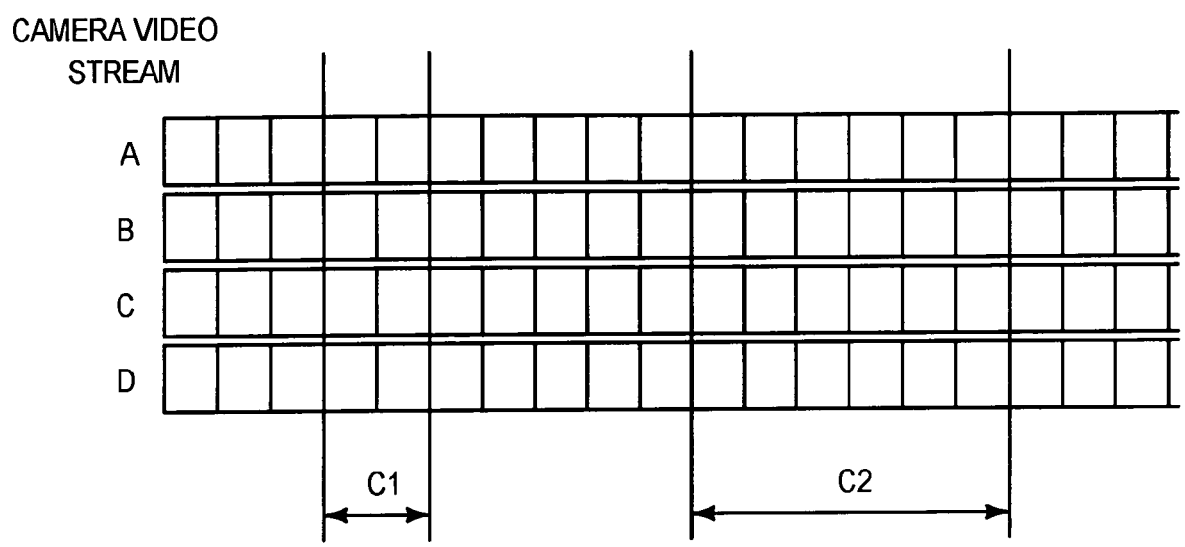
FIG. 5 illustrates how clips are selected.

FIG. 5 illustrates another type of editing step that may be performed. The entire stream of images from all the cameras need not be streamed to the viewer. As illustrated in FIG. 5, sections of the streams, called "clips" can be selected and it is these clips that are sent to a user. As illustrated in FIG. 5, two clips C1 and C2 are made from the video streams A to D. In general the clips would be compressed and stored on a disk file and called up when there is a request to stream them to a user. For example, a brief description of clips showing the key plays from a sporting event can be posted on a web server, and a user can then select which clips are of interest. A selected clip would then be streamed to the user. That is, the thumbnail images and a single focus stream would be sent to a user. The streaming would begin with a default camera view as the focus view. When desired, the user can switch the focus stream to any desired camera by clicking on the appropriate thumbnail. With the first embodiment of the invention, files such as clips are stored on the server in a file with a ".pan" file type. The pan file would have the data stream from each camera and the thumbnail data stream for a particular period of time.

The first embodiment of the invention is made to operate with the commercially available streaming video technology marketed by RealNetworks Inc. located in Seattle, Wash. RealNetworks Inc. markets a line of products related to streaming video including products that can be used to produce streaming video content, products for servers to stream video over the Internet and video players that users can use to receive and watch streamed video which is streamed over the Internet. FIGS. 4B and 4F show the units 401 and 402 in more detail.

As indicated in FIG. 4B, the web server 401 is a conventional server platform such as an Intel processor with an MS Windows NT operating system and an appropriate communications port. The system includes a conventional web server program 412. The web server program 412 can for example be the program marketed by the Microsoft Corporation as the "Microsoft Internet Information Server". A video streaming program 413 provides the facility for streaming video images. The video streaming program 413 can for example be the "RealSystem Server 8" program marketed by Real networks Inc. Programs 412 and 413 are commercially available programs. While the programs 412 and 413 are shown resident on a single server platform, these two programs could be on different server platforms. Other programs from other companies can be substituted for the specific examples given. For example the Microsoft corporation markets a streaming server termed the "Microsoft Streaming Server" and the Apple Corporation markets streaming severs called QuickTime and Darwin.

In the specific embodiment shown "video clips" are stored on a disk storage sub-system 411. Each video clip has a file type ".pan" and it contains the video streams from each of the four cameras and the thumbnail stream. When system receives a URL calling for one of these clips, the fact that the clip has a file type ".pan" indicates that the file should be processed by plug in 414.

One of the streams stored in a pan file is a default stream and this stream is sent as the focus stream until the user indicates that another stream should be the focus stream. Plug in 414 process requests from the user and provides the appropriate T and F streams to streaming server 413 which sends the streams to the user. The components of the plug 414 are explained later with reference to FIG. 4D. Code to implement plug in 414 (which handles pan files) files is given in the compact disk appendix that is part of this application.

As illustrated in FIG. 4C, client 402 is a conventional personal computer with a number of programs. The client 402 includes a Microsoft Windows operating system 422, and a browser program 423. The browser 423 can for example be the Microsoft Internet Explorer browser. Streaming video is handled by a commercially available program marketed under the name:"RealPlayer 8 Plus" by RealNetworks Inc. Programs 422, 423 and 424 are conventional commercially available programs. Other similar programs can also be used. For example Microsoft and Apple provide players for streaming video. A plug in 425 for the Real Player 424 renders images from pan files, that is, plug in 425 handles the thumbnail and focus data streams and handles the interaction between the client 402 and the plug in 414 in the server 401. The components in plug in 425 are given in FIG. 4E. The CD provided as an appendix to this application includes code which implements plug in 425.

FIGS. 4D and 4E are block diagrams of the programming plug in 414 and 425. Plug in 414 is shown in FIG. 4D. When the server encounter a request to stream a file with the file type ".pan", it retrieves this file from disk storage subsystem 411 (unless the file is made available to the server via some other input). The file is then transferred to plug in 414. This is indicated by block 432. Commands from the user i.e. "clicks" on a thumbnail, or other types of input from the user when a pan file is being streamed are also sent to this plug in 414. As indicated by block 435, plug in 435 selects the thumbnail stream and either a default or a requested stream from the pan file. As indicated by block 437, the thumbnail stream and the selected focus stream are sent to the "Real System Server 8" program. In alternate embodiments, other streams are also available in pan files. These other streams are selected and sent to the "Real System Server 8" program as appropriate in the particular embodiment. The CD provided as an appendix to this application includes code which implements plug in 425 for the first embodiment of the invention.

FIG. 4E is a block diagram of the programming components in the plug in 425 on the client machine. When the Real Player 8 Plus 424 encounters data from a pan files, the data is sent to plug in 425. FIG. 4E shows this data as block 451. The stream manager recognizes the different types of data streams and sends the data to an appropriate handler 454A to 454C. Data may be temporarily stored in a cache and hence, as appropriate the data handler retrieves data from the cache. Each handler is specialized and can handle a specific type of stream. For example one handler handles the thumbnail stream and another handler handles the focus stream. The thumbnail handler divides the composite images in the thumbnail stream into individual images. The handlers use a set of decoding, decompression and parsing programs 455A to 455B as appropriate. The system may include more handlers than shown in the figure if there are more kinds of data streams. Likewise the system may include as many decoder, decompression and parsing programs as required for the different types of streams in a particular embodiment. The brackets between the handlers and the decoders in FIG. 4E indicate that any handler can use any appropriate decoder and parser to process image data as appropriate. The decompressed and parsed data is sent to a rendering program 456 which sends the data to the real play input port to be displayed. A controller 443 controls gating and timing of the various operations.

It should be clearly noted the specific examples given in FIGS. 4A to 4E are merely examples of a first simplified embodiment of the invention. For example instead of working with a web server, the invention could work with other types of servers such as an intranet server or a streaming media server or in fact the entire system could be on a single computer with the source material being stored on the computer's hard disk. The interaction between the sever 401 and the client 402, and the manner the server responds to the client 402 is explained in detail later with reference to FIG. 12. It should be noted that all of the components shown in FIGS. 4A to 4E (other than the server platform and personal computer) are software components.

Figure 6:
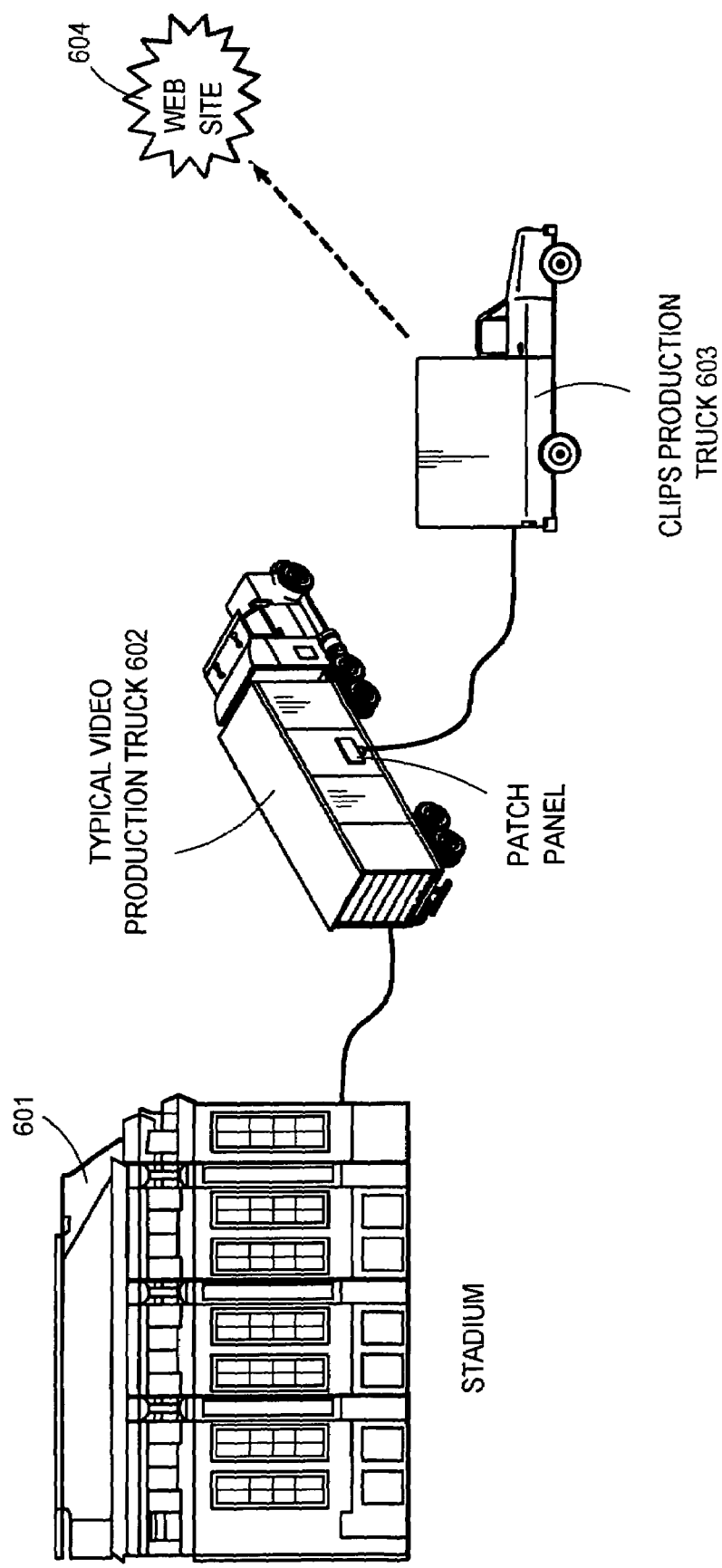
FIG. 6 is an overview of the production process.

FIG. 6 illustrates the system in a typical setup at a sporting event. The cameras and the sporting event are in stadium 601. The output from the camera goes to a video production truck 602 which is typical owned by a TV network. Such trucks have patch panels at which the output from the cameras can be made available to equipment in a clips production truck 603. The clip production truck 603 generates the clips and sends them to a web site 604.

Figure 7:
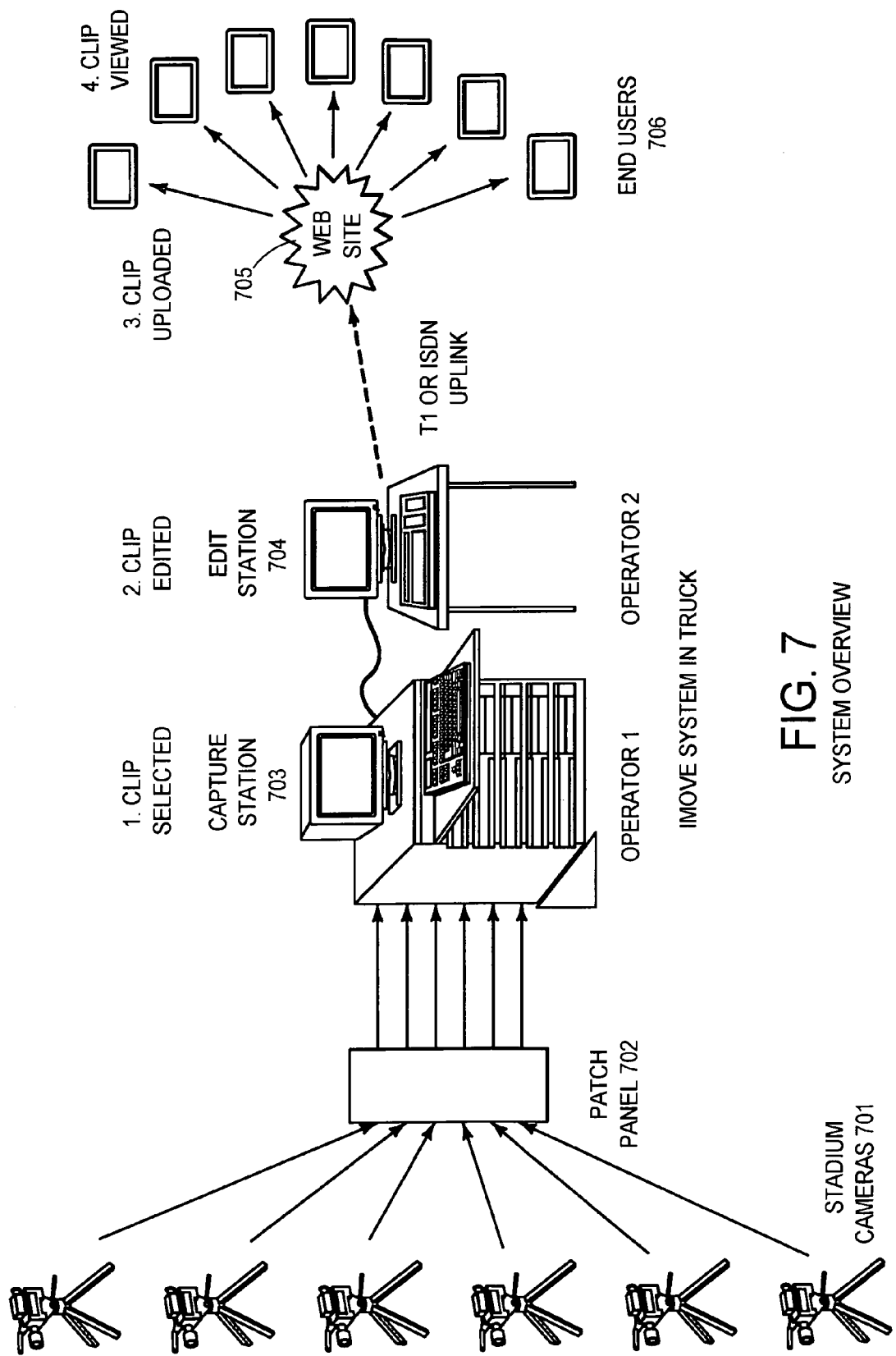
FIG. 7 is a system overview diagram.

FIG. 7 is a system overview of this alternate embodiment. The "feed" from stadium cameras 701 goes to patch panel 702 and then to a capture station 703. At station 703 operator 1 makes the clip selections as illustrated in FIG. 5. He does this by watching one of the channels and when he sees interesting action he begins capturing the images from each of the camera. The images are recorded digitally. The images can be digitally recorded with commercially available equipment. Cutting clips from the recorded images can also be done with commercially available equipment such as the "Profile™" and "Kalypso™" Video Production family of equipment marketed by Grass Valley Group Inc. whose headquarters are in Nevada City, Calif.

Figure 8:
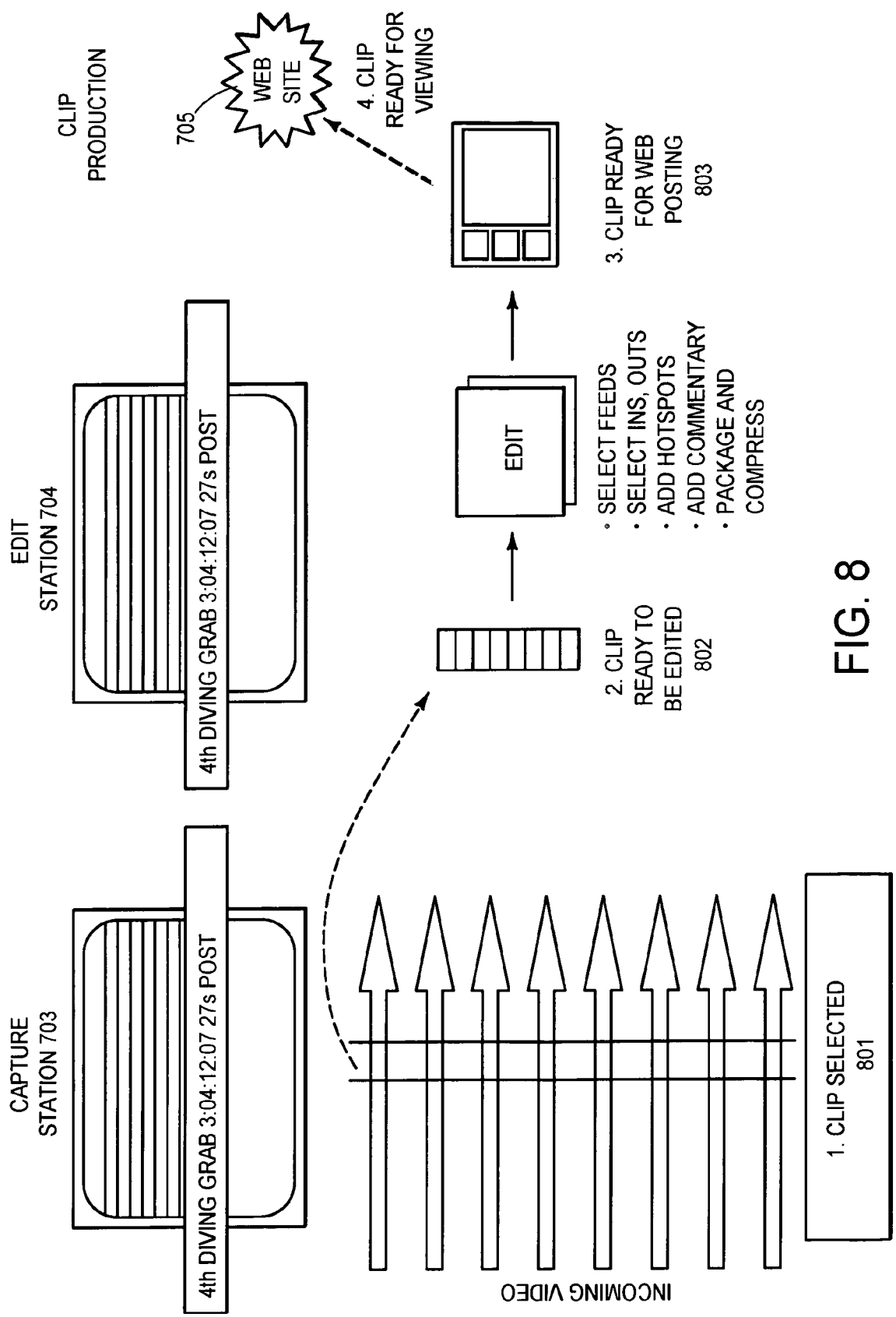
FIG. 8 illustrates the clip production process

As shown in FIG. 8 when a clip is selected as indicated at 801, the clip is stored and it is given a name as indicated on display 703. The stored clips are available to the operator of the edit station 704. At the edit station, the clip can be edited, hot spots can be added and voice can be added. Hot spots are an overlay provided on the images such that if the user clicks at a particular position on an image as it is being viewed, some action will be taken. Use of hot spots is a known technology. When the editing is complete the clips are compressed and posted on web site 705.

FIG. 9 illustrates what a user sees with another alternate embodiment of the invention. The alternative embodiment illustrated in FIG. 9 is designed for use with multiple cameras which record images which can be seamed into a panorama. Cameras which record multiple images which can be seamed into a panorama are well known. For example see co-pending application Ser. No. 09/338,790, filed Jun. 23, 1999 and entitled "A System for Digitally Capturing and Recording Panoramic Movies".

The embodiment shown in FIG. 9 is for use with a system that captures six images such as the camera shown in the referenced co-pending application (which is hereby incorporated herein by reference). The six images captured by the camera are: a top, a bottom, a left side, a right side, a front and a back images (i.e. there is a lens on each side of a cube). These images can be seamed into a panorama in accordance with the prior art and stored in a format such as an equirectangular or cubic format. With this alternative embodiment, the user sees a display such as that illustrated in FIG. 9. At the top center of the display is a thumbnail 901 of a panorama. The panoramic image is formed by seaming s together into one panoramic image, the individual images from the six cameras. Six thumbnails of images from the cameras (the top, bottom, left side, right side, front and back of the cube) are shown along the right and left edges of the display. If a user clicks on any one of the six thumbnails, on the right and left of the screen, the focus stream switched to that image stream as in the first embodiment. It is noted that with a panoramic image, it is usual for a viewer to select a view window and then see the particular part of the panorama which is in the selected view window. If the user clicks anywhere in the panorama 901, the focus stream is changed to a view window into the panorama which is centered at the point where the user clicked. With this embodiment, stream control has as one input a panoramic image and the stream control selects a view window from the panorama which is dependent upon where the user clicks on the thumbnail of the panorama. The image from this view window is then streamed to the user as the focus image.

In other alternative embodiments which show a thumbnail of a panorama, as described above, in addition to (or in place of) the thumbnails of the individual camera views from the camera which were used to record the panorama, thumbnails from other camera are provided. These additional cameras may be cameras which are also viewing the same event, but from a different vantage point. Alternatively they can be from some related event.

Figure 10:
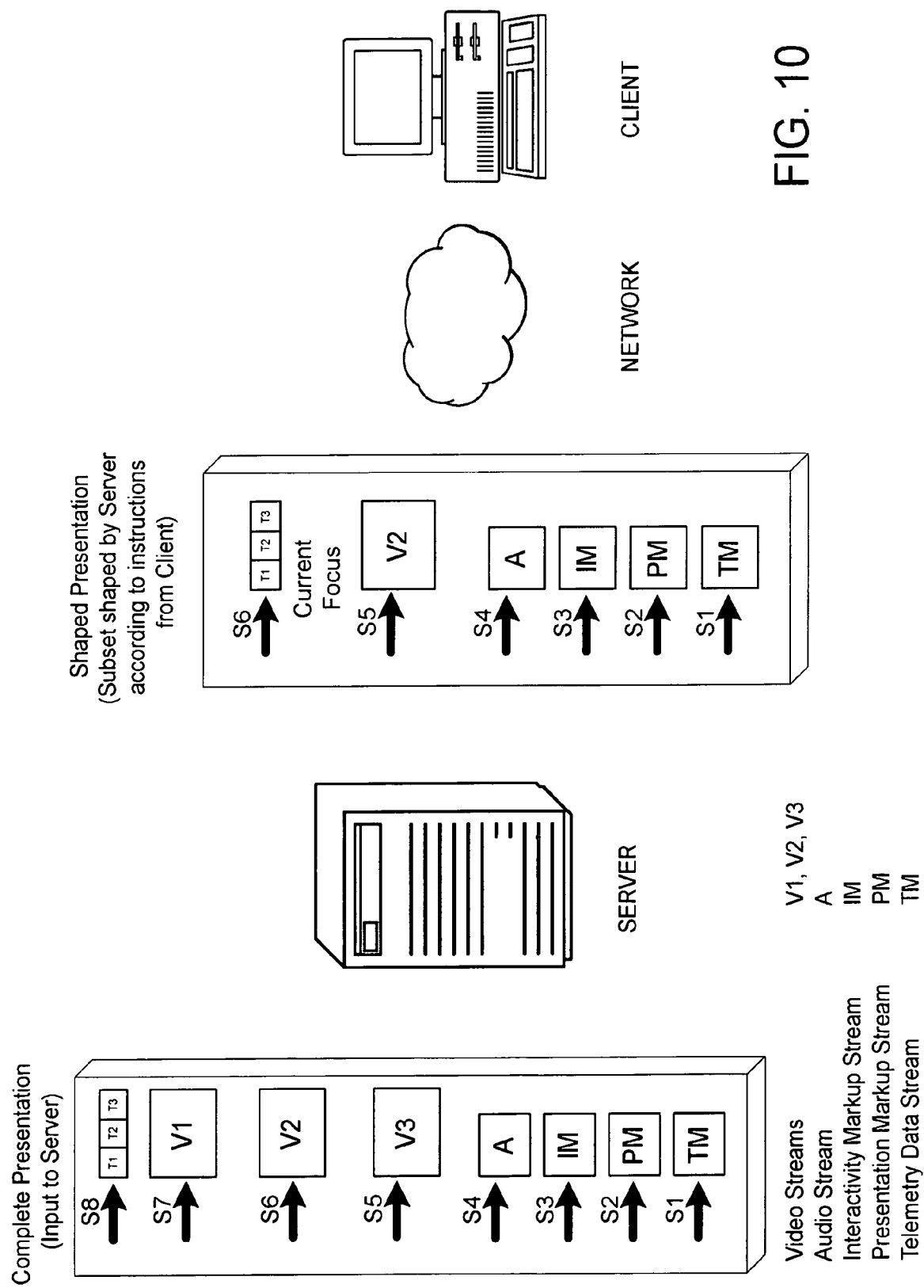
FIG. 10 illustrates an embodiment of the invention which includes additional data streams.

A somewhat more complicated alternate embodiment of the invention is shown in FIG. 10. In the embodiment illustrated in FIG. 10, a server 910 receives eight streams S1 to S8. The eight streams include four streams S5 to S8 that are similar to the video streams described with reference to the previously described embodiment. These four streams include a stream S8 where each image contains a thumbnail of the other images and three video streams designated V1 to V3.

The server selects the streams that are to be streamed to the user as described with the first embodiment of the invention. The selected streams are then sent over a network (for example over the Internet) to the client system.

The additional data streams provided by this embodiment of the invention include an audio stream S4, an interactivity markup stream S3, a presentation markup stream S2 and a telemetry data stream S1. The audio stream S4 provides audio to accompany the video stream. Typically there would be an single audio stream which would be played when any of the video streams are viewed. For example, there may be a play by play description of a sporting event which would be applicable irrespective of which camera is providing the focus stream. However, there could be an audio stream peculiar to each video stream.

The interactivity markup stream S3 describes regions of the presentation which provide for additional user interaction. For example there may be a button and clicking on this button might cause something to happen. The interactivity markup stream consists of a series of encoded commands which give type and position information. The commands can be in a descriptive language such as XML encoded commands or commands encoded in some other language. Such command languages are known and the ability to interpret commands such as XML encoded commands is known.

The presentation markup stream provides an arbitrary collection of time synchronized images and data. For example, the presentation markup stream can provide a background image for the display and provide commands to change this background at particular times. The presentation mark up stream may provide data that is static or dynamic. The commands can, for example, be in the form of XLM encoded commands.

The telemetry data stream S1 can provide any type of statistical data. For example this stream can provide stock quotes or player statistics during a sporting event. Alternatively the stream could provide GPS codes indicating camera position or it could be video time codes.

Figure 11:
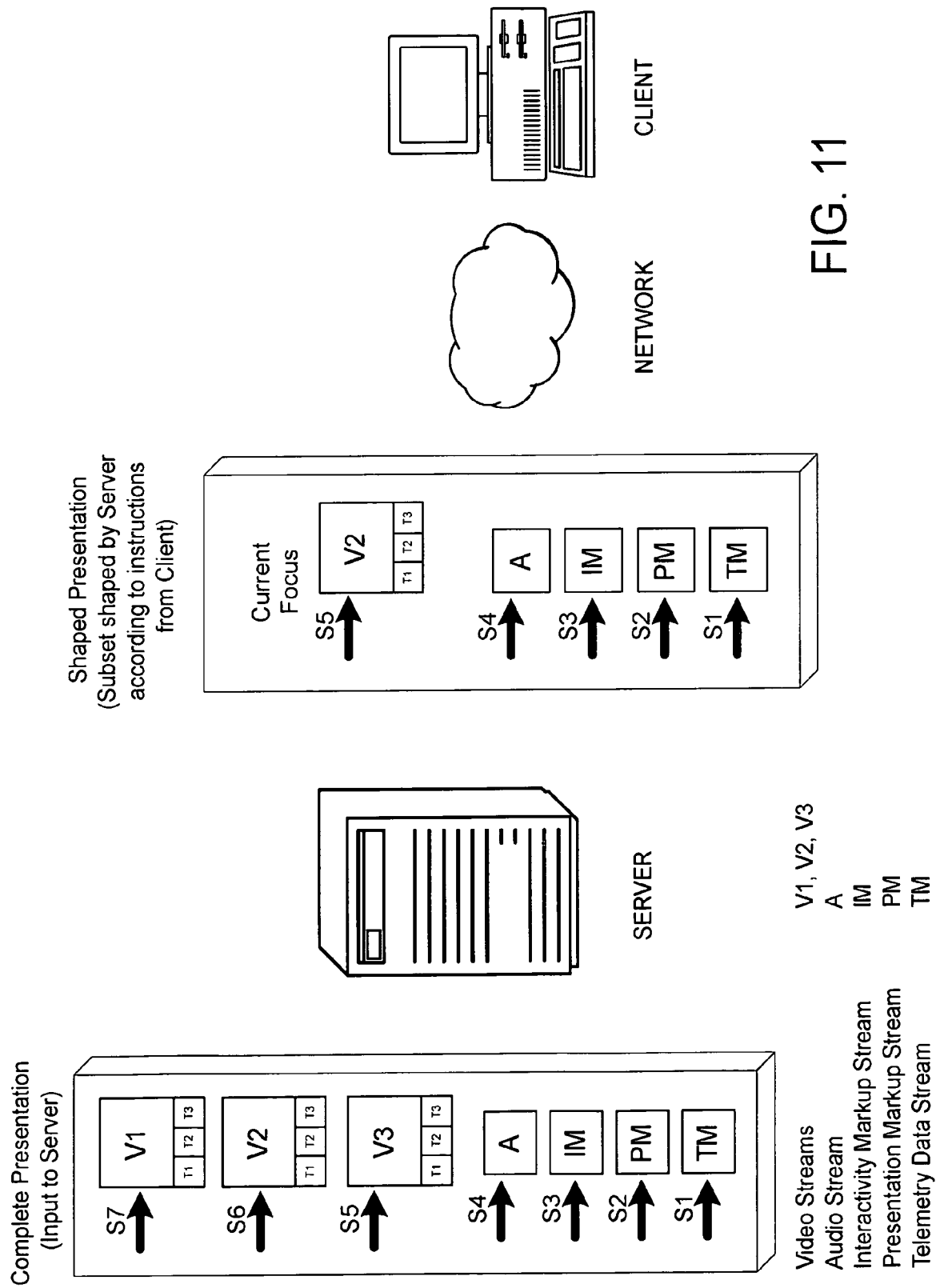
FIGS. 11 and 11A illustrate an embodiment of the invention where the thumbnail images are transmitted and displayed with the focus view.
Figure 11A:
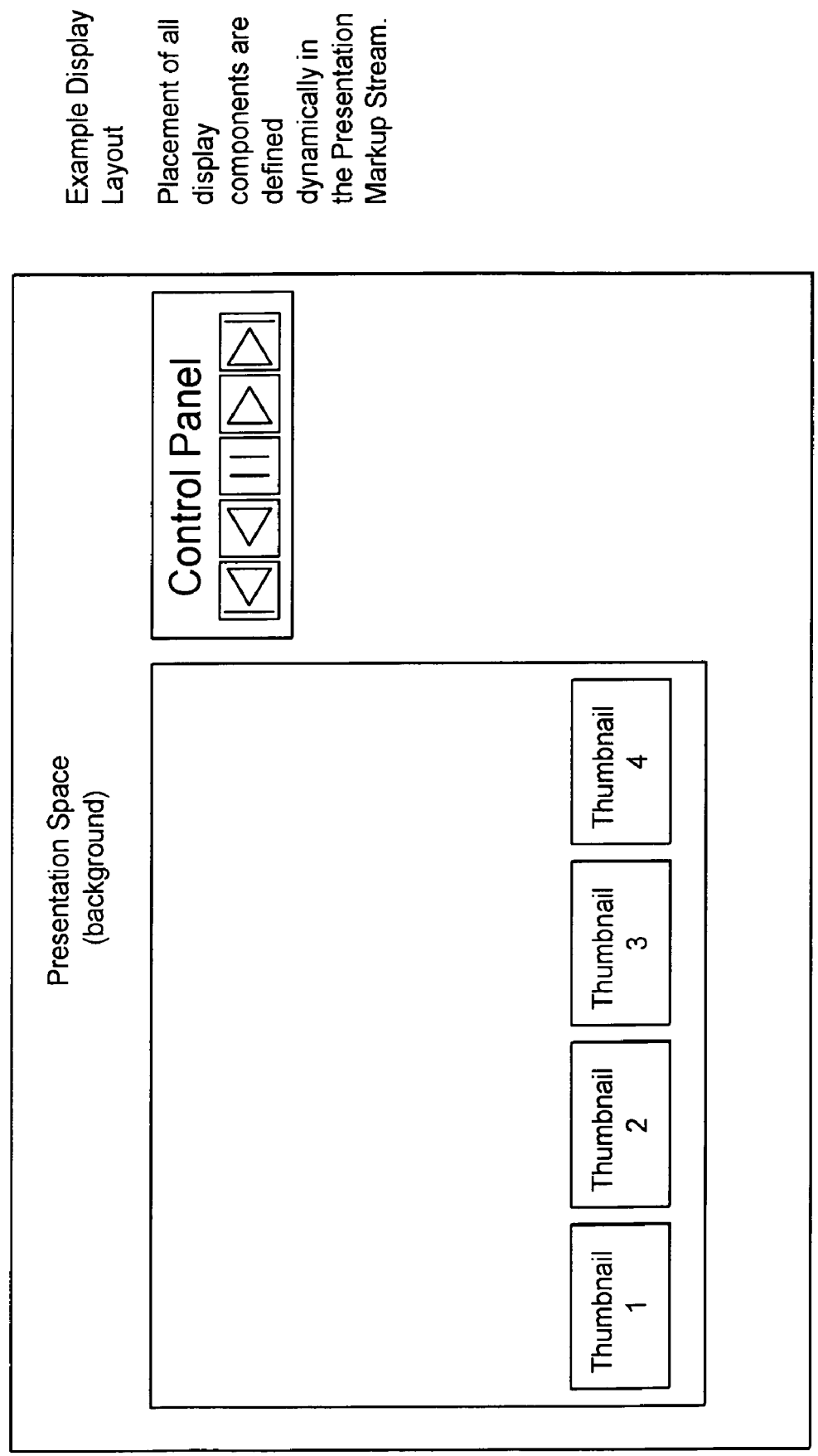

Yet another alternate embodiment of the invention is shown in FIG. 11. With the embodiment shown in FIG. 11, there is not a separate video stream for the thumbnail images. In this embodiment, instead of having a separate stream for the thumbnail, the thumbnails are transmitted as part of the video streams V1, V2 and V3. A set of the thumbnails is included in each of the video streams. Hence, irrespective of which video stream is selected for the focus steam, the user will have available thumbnails of the other streams. FIG. 11A illustrates the display showing an image from the focus stream with the thumbnails on the bottom as part of this image.

A key consideration relative to video streaming is the bandwidth required. If unlimited bandwidth were available, all the data streams would be sent to the client. The present invention provides a mechanism whereby a large amount of data, for example data from a plurality of camera, can be presented to a user over a limited bandwidth in a manner such that the user can take advantage of the data in all the data streams. The specific embodiments shown relate to data from multiple camera that are viewing a particular event. However, the multiple streams need not be from cameras. The invention can be used in any situation where there are multiple streams of data which a user is interested in monitoring via thumbnail images. With the invention, the user can monitor the multiple streams via the thumbnail images and then make any particular stream the focus stream which becomes visible in an high quality image. Depending upon the amount of bandwidth available there could be a large number of thumbnails and there may be more than one focus stream that is sent and shown with a higher quality image.

The flowing table shows the bandwidth requirements of various configurations.

focus stream is a default stream. The client's screen is configured according to the layout information given in the presentation mark up stream. For example this could be XML encoded description commands in the presentation markup stream. In the example given, at this point the client requests that the focus stream change. This is sent to the server as indicated by arrow 994.

When the server receives the command, it stops streaming the old focus stream and starts streaming the new focus stream as indicated by arrow 995. A new layout for the user's display is also sent as indicated by arrow 996. It is noted that a wide variety of circumstances could cause the server to send to the client a new layout for the users display screen. When the client receives the new display layout, the display is reconfigured.

Arrow 997 indicates that the user can request an end to the streaming operation. Upon receipt of such a request or when the presentation (e.g. the clip) ends, the server stops the streaming operation and ends access to the presentation source as indicated by arrows 998. The server also ends the

| Main Video Size 320 × 240 | | | | | | |
|---|---|---|---|---|---|---|
| Number Video Streams | 2 | 2 | 3 | 3 | 4 | 4 |
| Video Stream Vertical | 240 | 240 | 240 | 240 | 240 | 240 |
| Video Stream Horizontal | 320 | 320 | 320 | 320 | 320 | 320 |
| Thumbnail Vertical | 100 | 100 | 100 | 100 | 100 | 100 |
| Thumbnail Horizontal | 75 | 75 | 75 | 75 | 75 | 75 |
| Video frame rate | 7 | 15 | 7 | 15 | 7 | 15 |
| Color Depth (bits) | 24 | 24 | 24 | 24 | 24 | 24 |
| MPEG4 Video Compression ratio | 150 | 150 | 150 | 150 | 150 | 150 |
| Presentation Video Bandwidth | 188832 | 404640 | 283248 | 606960 | 377664 | 809280 |
| Shaped Video Bandwidth | 102816 | 220320 | 111216 | 238320 | 119616 | 256320 |
| Number Audio Streams | 1 | 1 | 1 | 1 | 1 | 1 |
| Audio bitrate | 30000 | 30000 | 30000 | 30000 | 30000 | 30000 |
| Presentation Audio Bandwidth | 30000 | 30000 | 30000 | 30000 | 30000 | 30000 |
| Number Telemetry Streams | 1 | 1 | 1 | 1 | 1 | 1 |
| Telemetry bit rate | 500 | 500 | 500 | 500 | 500 | 500 |
| Presentation Telemetry Bandwidth | 500 | 500 | 500 | 500 | 500 | 500 |
| Number Presentation Markup Stream | 1 | 1 | 1 | 1 | 1 | 1 |
| Markup bitrate | 2500 | 2500 | 2500 | 2500 | 2500 | 2500 |
| Presentation Markup Bandwidth | 2500 | 2500 | 2500 | 2500 | 2500 | 2500 |
| Number Interactivity Markup Stream | 1 | 1 | 1 | 1 | 1 | 1 |
| Markup bitrate | 1000 | 1000 | 1000 | 1000 | 1000 | 1000 |
| Presentation Markup Bandwidth | 1000 | 1000 | 1000 | 1000 | 1000 | 1000 |
| Presentation Bandwidth (bps) | 222832 | 438640 | 317248 | 640960 | 411664 | 843280 |
| Presentation Bandwidth (Kbs) | 217.61 | 428.36 | 309.81 | 625.94 | 402.02 | 823.52 |
| Presentation Bandwidth (KBs) | 27.20 | 53.54 | 38.73 | 78.24 | 50.25 | 102.94 |
| Shaped Bandwidth | 136816 | 254320 | 145216 | 272320 | 153616 | 290320 |
| Shaped Streaming (Kbs) | 133.61 | 248.36 | 141.81 | 265.94 | 150.02 | 283.52 |
| Shaped Streaming (KBs) | 16.70 | 31.04 | 17.73 | 33.24 | 18.75 | 35.44 |

Figure 12:
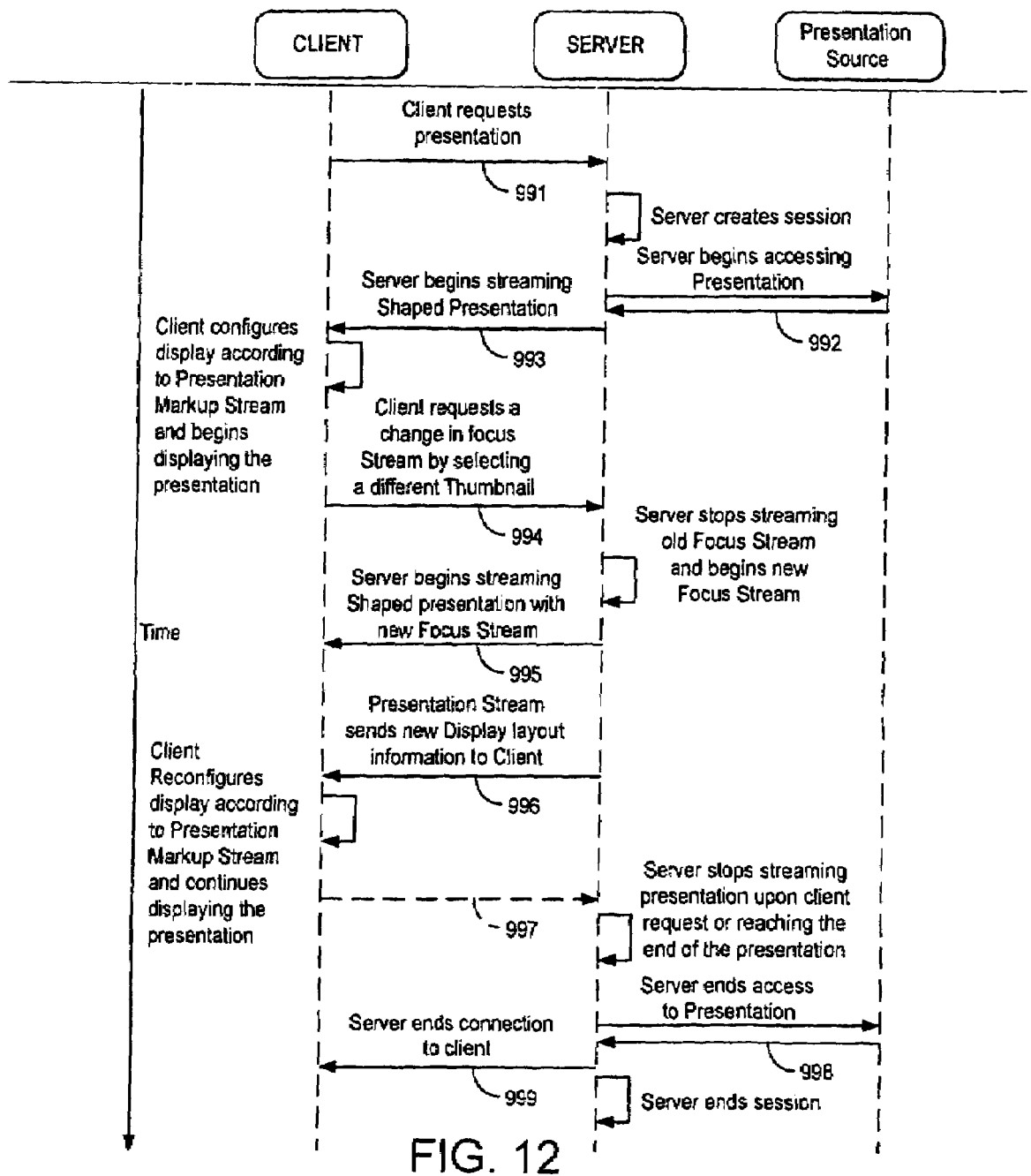
FIG. 12 illustrates the interaction between the client and the server over time.

The interaction between the server and the client is illustrated in FIG. 12. FIG. 12 illustrates the three components of the system. The components are: The client: The client is operated by a user. It displays the presentation content received from the server. It instructs the server to change Focus streams, play forward, backwards, fast forward, fast reverse, replay pause and stop. The server: The server responds to client requests. The presentation source: The presentation source could be disk storage, a remote server, or a feed from a computer that is generating a presentation from live inputs.

As illustrated in FIG. 12, the process begins when the client requests a presentation as indicated by arrow 991. This creates a server session and the server begins accessing the presentation from the presentation source and providing it to the server as indicated by arrow 992. The server then being streaming this information to the client. At this point the connection to the client as indicated by arrow 999 and the server session ends. It should be understood that the above example is merely illustrative and a wide variety of different sequences can occur.

Another embodiment of the invention operates by sending base information to create the thumbnail images and additional information to create the focus image. The user sees the same display with this embodiment as the user sees with the previously described embodiments; however, this embodiment uses less bandwidth. With this embodiment, the focus data stream is not a stream of complete images. Instead, the focus stream is merely additional information, that can be added to the information in one of the thumbnails images to create a high resolution image. The thumbnail images provide basic information which creates a low resolution thumbnail. The focus stream provides additional information which can be added to the information in a thumbnail to create a high resolution large image.

The following table illustrates the bandwidth savings:

| Main Video Size 320 × 240 | Previously embodiment | Using Base and Enhancement Layers |
|---|---|---|
| Number of Input Video Streams | 3 | 3 |
| Number Base Layer Streams | 0 | 3 |
| Number Enhancement Layer Streams | 0 | 3 |
| Video Stream Vertical | 240 | 240 |
| Video Stream Horizontal | 320 | 320 |
| Thumbnail Vertical | 75 | 75 |
| Thumbnail Horizontal | 100 | 100 |
| Video frame rate | 15 | 15 |
| Color Depth (bits) | 24 | 24 |
| MPEG4 Video Compression ratio | 150 | 150 |
| Presentation Video Bandwidth | 606960 | 552960 |
| Shaped Video Bandwidth | 238320 | 184320 |
| Number Audio Streams | 1 | 1 |
| Audio bitrate | 30000 | 30000 |
| Presentation Audio Bandwidth | 30000 | 30000 |
| Number Telemetry Streams | 1 | 1 |
| Telemetry bit rate | 500 | 500 |
| Presentation Telemetry Bandwidth | 500 | 500 |
| Number Presentation Markup Stream | 1 | 1 |
| Markup bitrate | 2500 | 2500 |
| Presentation Markup Bandwidth | 2500 | 2500 |
| Number Interactivity Markup Stream | 1 | 1 |
| Markup bitrate | 1000 | 1000 |
| Presentation Markup Bandwidth | 1000 | 1000 |
| Presentation Bandwidth (bps) | 640960 | 586960 |
| Presentation Bandwidth (Kbs) | 625.94 | 573.20 |
| Presentation Bandwidth (KBs) | 78.24 | 71.65 |
| Shaped Bandwidth | 272320 | 218320 |
| Shaped Streaming (Kbs) | 265.94 | 213.20 |
| Shaped Streaming (KBs) | 33.24 | 26.65 |

Subdividing the image data can further reduce bandwidth by allowing optimized compression techniques to be used on each subdivision. Subdivisions may be made by any desirable feature of the imagery, such as pixel regions, foreground/background, frame rate, color depth, resolution, detail type, etc., or any combination of these. Each data stream can be compressed using a technique that preserves the highest quality for a given bandwidth given its data characteristics. The result is a collection of optimally compressed data streams, each containing a component of the resultant images. With this embodiment, each thumbnail image stream is constructed on the client by combining several of these data streams, and its corresponding focus image stream is constructed on the client by combining the thumbnail streams (or thumbnail images themselves) and more data streams.

For example, consider a multiple view video that consists of different views of live action characters superimposed against the same static background image. The client sees a low-resolution thumbnail stream for each view and a high-resolution focus stream of one of them. These view streams could be compressed as described before, with a low-resolution thumbnail stream and additional data streams for turning them into high-resolution focus streams. However, additional bandwidth savings can be realized if two features of the images streams are utilized: a) the frame rate of the background image is different than the foreground, specifically, the background image is static throughout the entire presentation, so only one image of it ever needs to be sent regardless of how many image frames the presentation is, and b) the same background image is used for all the view streams, so only one copy of the background image needs to be sent and can be reused by all the view streams. In order to realize this bandwidth savings, a foreground/background subdivision may be made to the video data in the following way:

a) A data stream containing a single low-resolution background image that is reused to generate all the thumbnail images
 b) Data streams containing low-resolution foreground images for the thumbnail views, one stream per view.
 c) A data stream containing additional data to boost the low-resolution background image to become the high-resolution background image.
 d) Data streams containing additional data for boosting the low-resolution foreground images to become high-resolution foreground images.

In this embodiment, each image in the thumbnail stream is generated on the client by combining the low-resolution background image with the appropriate low-resolution foreground image. Each image in the focus stream is generated on the client by: adding the additional background image data to the low-resolution background image to generate the high-resolution foreground image, adding the additional foreground image data to the low-resolution foreground image to generate the high-resolution foreground image, and then combining the high-resolution foreground and background images to generate the final focus-stream image.

As another example, consider a video where each stream contains a view of a subject against a blurry background, such as one might see at a sporting event where a cameraman has purposely selected camera settings that allow the player to be in crisp focus while the crowd behind the player is significantly blurred. The client sees a low-resolution thumbnail stream for each view and a high-resolution focus stream of one of them. These views could be compressed with a quality setting chosen to preserve the detail in the player. However, bandwidth savings could be realized by utilizing the fact that the blurry crowd behind the player is unimportant to the viewer and can therefore be of lower quality. In order to realize this bandwidth savings, a pixel region subdivision can be made to the image data in the following way:

a) A data stream containing the player region in low resolution, for the thumbnail images.
 b) A data stream containing the remaining image region in low-resolution, for the thumbnail images. This image region would be compressed with a lower quality than that used for the player region.
 c) An additional data stream, one per focus view, for boosting the low-resolution player region into a high-resolution player region.
 d) An additional data stream, on per focus view, for boosting the remaining image region from low-resolution to high-resolution. This image region would be compressed with a lower quality than that used for the player region.

Each image in the thumbnail stream is generated on the client by combining the player region with the rest of that image. Each image in the focus stream is generated on the client by: adding the additional player region data to the low-resolution player image to generate the high-resolution player image, adding the additional remaining image data to the low-resolution remaining image region generate the high-resolution remaining image region, and then combining the two regions to generate the final focus-stream image.

As another example, consider a video where each stream contains fast-moving objects that are superimposed on slowly changing backgrounds. The client sees a low-resolution thumbnail stream for each view and a high-resolution focus stream of one of them. Each stream of video could use a frame rate that allows the fast-moving object to be displayed smoothly. However, bandwidth savings could be realized by utilizing the fact that the slowly changing background differs little from one frame to the next, while the fast-moving object differs significantly from one frame to the next. In order to realize this bandwidth savings, a pixel region subdivision must be made to the image data in the following way:

a) A data stream containing the fast-moving object regions in low resolution, for the thumbnail images. This stream uses a fast frame rate.
   b) A data stream containing the remaining image region in low-resolution, for the thumbnail images. This stream uses a slower frame rate than what was used for the fast-moving object region.
   c) An additional data stream, one per focus view, for boosting the low-resolution fast-moving object region into a high-resolution fast-moving object region. This stream uses a fast frame rate.
   d) An additional data stream, on per focus view, for boosting the remaining image region from low-resolution to high-resolution. This stream uses a slower frame rate than what was used for the fast-moving object region.

In this embodiment, each image in the thumbnail stream is generated on the client by combining the fast-moving object region with the most-recent frame of the rest of that image. Each image in the focus stream is generated on the client by: adding the additional fast-moving object region data to the low-resolution fast-moving object image to generate the high-resolution fast-moving object image, adding the additional remaining image data to the low-resolution remaining image region to generate the high-resolution remaining image region, and then combining the high-resolution fast-moving object regions with the most recent frame of the remaining image region to generate the final focus-stream image.

As another example, consider a video where each stream contains well-lit subjects in front of a differently lit background that results in a background that is shades of orange. The client sees a low-resolution thumbnail stream for each view and a high-resolution focus stream of one of them. Each stream of video could use the whole images as is. However, bandwidth savings could be realized by utilizing the fact that the background uses a restricted palette of orange and black hues. In order to realize this bandwidth savings, a pixel region subdivision must be made to the image data in the following way:

a) A data stream containing the image region that the well-lit subject occupies, for the thumbnail images. Full color data is retained for these images.
   b) A data stream containing the remaining image region in low-resolution, for the thumbnail images. For these images, the full color data is discarded and only the brightness value part of the color data is retained, allowing fewer bits of data to be used for these images. Upon decompression, these brightness values will be used to select the appropriate brightness of orange coloration for that part of the image.
   c) An additional data stream, one per focus view, for boosting the low-resolution image of the well-lit subject into a high-resolution image of the well-lit subject. Full color data is retained for this additional data.
   d) An additional data stream, on per focus view, for boosting the remaining image region from low-resolution to high-resolution. For this additional data, the full color data is discarded and only the brightness value part of the color data is retained, allowing fewer bits of data to be used. Upon decompression, these brightness values will be used to select the appropriate brightness of orange coloration for that part of the image.

In this embodiment, each image in the thumbnail stream is generated on the client by combining the well-lit subject object region with the remaining image region in which the brightness values in the image were used to select the correct brightness of orange color for those parts of the image. Each image in the focus stream is generated on the client by: adding the additional well-lit subject region data to the low-resolution well-lit subject image to generate the high-resolution well-lit subject image, adding the additional remaining image data to the low-resolution remaining image region to generate the high-resolution remaining image region and using the brightness values in the image to select the correct brightness of orange color for those parts of the image, and then combining the high-resolution well-lit subject regions with the remaining image region generated earlier.

While the invention has been shown and described with respect to a plurality of preferred embodiments, it will be appreciated by those skilled in the art, that various changes in form and detail may be made without departing from the spirit and scope of the invention. The scope of applicant's invention is limed only by the appended claims.

We claim:

1. A system for displaying to a user a focus stream and a plurality of other video streams, said system comprising,
   a client system which can display said focus stream, and a composite video containing a thumbnail image of each of said plurality of video streams, each video stream capturing a same scene from a different point of view, said client system displaying said focus stream along with said composite video and a panorama comprising at least two of said plurality of video streams seamed together,
   a server which receives said composite video stream, and which provides said focus stream and said composite video stream to said client system, and
   an input device connected to said client system whereby a user can select one of said thumbnails thereby sending a signal to said server indicating which of said plurality of video streams should be sent to said client system as said focus stream.

2. The system recited in claim 1 wherein said server also sends a presentation markup stream to said client machine to control the presentation of images by said client machine.

3. The system recited in claim 1 wherein said server also sends an audio stream to said client machine.

4. The system recited in claim 1 wherein said server also sends an interactivity mark up stream to said client system to describe regions of the presentation that provide additional user interaction with said system.

5. The system recited in claim 1 wherein said server also sends a stream of telemetry data to said client machine.

6. The system recited in claim 1 wherein said server also sends an audio stream, a presentation mark up stream, and an interactive markup stream to said client machine.

7. A method of streaming selected data from a plurality of cameras to a client machine comprising the steps of:
   streaming to said client machine a focus stream containing the images from a particular one of said cameras and a second video stream, each image in which contains a thumbnail of the images from each of said cameras, each video stream capturing a same scene from a different point of view, said client machine displaying said focus stream along with said second video stream and a panorama comprising video streams from at least two of said cameras seamed together, selecting at said client machine one of said thumbnails and responding when a thumbnail from a particular camera is selected by making said focus stream the images from said selected camera.

8. The method recited in claim 7 wherein a presentation mark up stream is sent to said client machine to control the display of images on said client machine.

9. The method recited in claim 7 wherein an audio stream is also sent to said client machine.

10. The method recited in claim 7 wherein an interactivity mark up stream is sent to said client system to describe regions of the presentation that provide additional user interaction with said system.

11. The method recited in claim 7 wherein a stream of telemetry data is also sent to said client machine.

12. A method for displaying a plurality of video streams, the method comprising:

receiving a focus stream selected from the plurality of video streams, each video stream capturing a same scene from a different point of view;

receiving a second stream comprising a thumbnail of at least one of the other video streams, wherein the focus stream has a higher resolution than the thumbnail;

displaying the focus stream along with the thumbnail;

seaming together at least two of the video streams to form a panorama; and displaying the panorama along with the focus stream and the thumbnail.

13. The method of claim 12 further comprising:

sending a signal that the thumbnail has been selected; and as a result of sending said signal, receiving a focus stream comprising the video stream corresponding to the selected thumbnail.

14. The method of claim 12 wherein the second stream comprises a composite video stream comprising thumbnails of at least two of the other video streams.

15. The method of claim 12 wherein the focus stream is a view window into the panorama and the focus stream has a higher resolution than the panorama.

16. The method of claim 12 further comprising:

buffering the focus stream in a first buffer; and buffering the second stream in a second buffer.

17. The method of claim 12 further comprising:

receiving a background image; and displaying the focus stream and the thumbnail superimposed over the background image.

18. The method of claim 12 wherein display of the focus stream includes hot spots that can be used to activate commands.

19. A method for transmitting a plurality of video streams, the method comprising:

transmitting to a client a focus stream selected from the plurality of video streams, each video stream capturing a same scene from a different point of view; and transmitting to the client a second stream comprising a thumbnail of at least one of the other video streams, wherein the focus stream has a higher resolution than the thumbnail, and the client displays the focus stream along with the thumbnail and a panorama comprising at least two of the plurality of video streams seamed together.

20. A method for displaying a plurality of video streams, the method comprising:

receiving a focus stream selected from the plurality of video streams, each video stream capturing a same scene from a different point of view;

receiving a second stream comprising a thumbnail of at least one of the other video streams, wherein the focus stream has a higher resolution than the thumbnail;

displaying the focus stream along with the thumbnail;

seaming together at least two of the video streams to form a panorama;

displaying the panorama along with the focus stream and the thumbnail, wherein the focus stream is a view window into the panorama and the focus stream has a higher resolution than the panorama.

* * * * *